Patented Feb. 13, 1934

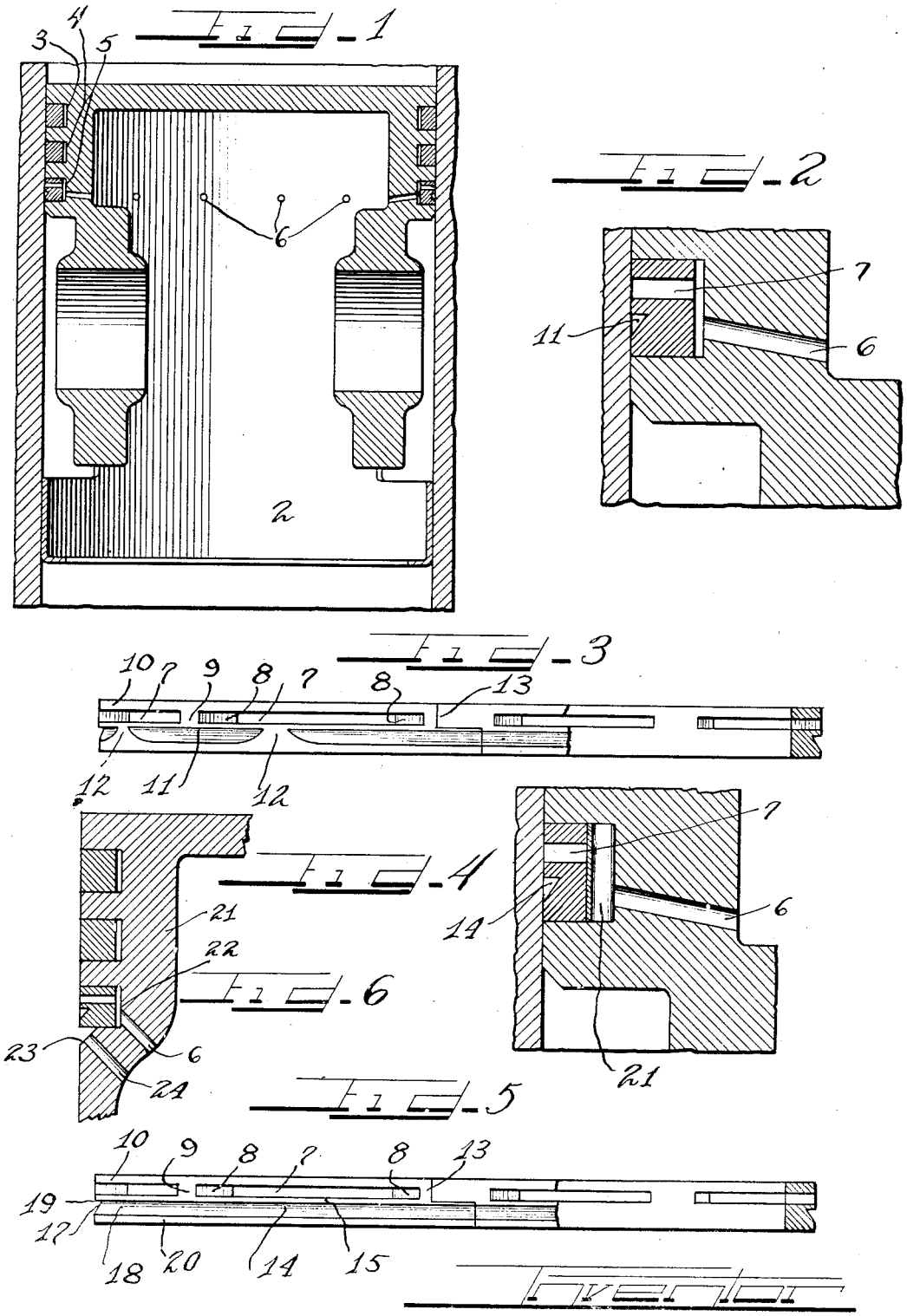

1,946,677

UNITED STATES PATENT OFFICE 1,946,677

PISTON RING FOR INTERNAL COMBUSTION ENGINES

Albert P. Fall, Toledo, Ohio

Application November 19, 1931
Serial No. 576,091

4 Claims. (Cl. 309—45)

The present invention relates to pistons and piston rings for internal combustion engines and more particularly to oil regulating rings for effectively removing excess oil from the walls of the cylinders, preventing oil pumping and increasing lubrication efficiency.

An object of the present invention is to provide a piston ring for internal combustion engines wherein a satisfactory oil seal may be effected between the ring and cylinder wall and at the same time the relatively movable parts may be efficiently lubricated.

Another object of the invention is to provide an oil regulating ring having drain openings near the upper surface of the ring and a recess beneath the said openings for accumulating excess oil for lubricating purposes.

A further object of the invention is to provide a piston ring of the oil regulating type having a series of oil openings circumferentially spaced and disposed near the upper surface of the ring, together with oil accumulating recesses disposed below the opening, together with narrow marginal base portions for engaging the cylinder walls whereby the rings may exert substantially uniform pressure against the cylinder walls throughout the circumference of the rings.

A still further object of the invention is to provide an oil regulating ring for internal combustion engines having oil passageways and oil collecting recesses formed in the ring which passageways and recesses are out of communication with one another and which passages and recesses are separated by a narrow marginal rib which constitutes a scraping edge under certain conditions.

Another and further object of the invention is to provide a piston ring for internal combustion engines which lends itself very readily to high speed high compression engines in use at the present time and which is provided with oil drain passages and oil receiving recesses for providing proper lubrication at all times between the cylinder wall and ring.

Generally speaking, the invention contemplates a piston ring having openings through the same near the top surface thereof and a recess or groove or a plurality of recesses or grooves below the openings for the accumulation of excess oil.

The invention further contemplates a narrow marginal rib intermediate the top and bottom surfaces of the ring which serves as a scraping edge under certain conditions of service.

Embodiments of the present invention are illustrated in the accompanying drawing and the views thereof are as follows:

Figure 1 is a vertical central section through a fragmental portion of a piston having inserted in one of the ring grooves thereof a piston ring embodying principles of the present invention.

Figure 2 is an enlarged fragmental view of a piston, a cylinder, with a ring embodying principles of the present invention in a ring groove of the piston.

Figure 3 is a front elevational view, partially broken away, of a piston ring constructed in accordance with the principles of the present invention.

Figure 4 is a view similar to Figure 2 showing a ring of the present invention installed with an inner ring or expander.

Figure 5 is a view similar to Figure 3 showing another embodiment of the present invention.

Figure 6 is a fragmental sectional view of a cast iron piston provided with a piston ring of the present invention.

The drawing will now be explained.

A cylinder 1 has a piston 2 reciprocable therein as is usual. The piston is provided with three ring receiving grooves 3, 4, and 5 with conventional rings installed in grooves 3 and 4 and a ring of the present invention installed in groove 5. The piston is provided with oil passages or holes 6 which serve as drains between the groove 5 and the interior of the piston so that excess oil may be returned to the crank case from the ring groove through these passages.

Referring to Figure 3 it will be noted that the ring there illustrated is provided with a series of closely adjacent circumferentially spaced openings 7 having the top and bottom surfaces of the openings parallel and with the ends 8 converging inwardly. The several openings 7 are circumferentially separated by bridges 9 which lie in the surface 10 of the upper marginal rib of the ring.

The ring is provided with a series of circumferentially spaced recesses or channels 11 which are circumferentially separated by bridges 12 which bridges lie in the same cylindrical surface as the bridges 9 separating the openings 7. The ring is so constructed that an opening 7 communicates with at least two of the recesses 11 and at the same time one of the recesses 11 communicates with at least two of the openings 7.

Adjacent the split 13 the recesses 12 are prolonged so as to communicate and form a complete recess across the split when a ring is installed and in use.

The ring illustrated in Figure 5 is quite similar to that illustrated in Figure 3 with the exception that instead of there being a plurality of circumferentially spaced recesses 11 there is a single continuous groove or recess 14 formed in the outer surface of the ring below the series of openings. The groove or recess is separated from the opening 7 by intermediate marginal rib 15. The groove is formed by an undercut at 16 and an outwardly and downwardly inclined sidewall 17. The undercut, formed to provide the topwall 17, provides a scraping edge at 19 which serves as a scraping edge during the down stroke of the piston carrying the ring of the present invention. The inclined wall 18 slopes downwardly and merges with narrow rib 20 which contacts the cylinder wall.

There are provided, it will be observed, three marginal ribs which engage the cylinder wall, to-wit: surface 10, the intermediate or middle rib 15 and the lower rib 20. The bridges 9 separating the openings 7 lie in the cylindrical surface including marginal ribs 10, 15 and 20 so that there is thus provided sufficient contact area for engagement between the piston ring and cylinder wall and at the same time the ring maintains proper tension with respect to the cylinder wall in spite of the metal cut away to provide the openings 7 and the groove or recess 14.

Figure 4 illustrates a ring embodying the principles of the present invention installed with an expander 21. When it is desired to use an expander, such as 21, the radial depth of the ring is decreased so as to make the ring thinner to thus accommodate the ring and the expander 21 in the ring groove of the piston without increasing the depth of the same.

Either form of the rings shown in Figures 3 and 5 may be utilized for use with or without expanders.

In the operation of a piston equipped with a ring of the present invention, the scraping edge 19 will on down stroke accumulate excess oil on the cylinder wall and gather it into the recess 14 which recess, because of its continuity, allows the accumulation of a considerable amount of excess oil. The top edges of the various openings 7 might to some extent serve as scraping edges on the down stroke.

On the upstroke the edges forming the lower surfaces of the openings 7 might serve as scraping edges thus scraping what little excess oil there may be into the openings 7 for drainage through the rings then through the passages 6 to the crank case in the usual manner.

The function of the recesses or grooves 14 and 11 is to provide an oil seal between the ring and the cylinder wall, and thus facilitate proper lubrication. Excess oil is drained through the openings 7 and to the crankcase through the passages 6 in the piston.

The recesses 11 and 14 serve as oil pockets wherein oil accumulates and constitutes what might be said to be a dominant supply of oil for lubricating purposes so that at all times there is present sufficient oil for proper and perfect lubrication.

Figure 6 illustrates a fragmental portion of a cast iron piston 21 having in the lower ring groove 22 a piston ring embodying principles of the present invention. The piston is chamfered at 23 thus shortening the bottom wall of the groove 22 and also is drilled at 24 to provide an oil drain from the chamfered portion to the interior of the piston for return of oil to the crank case to aid in relieving the excess oil accumulating between the bottom of the ring in the groove 22 and the cylinder wall. There is the usual port 6 communicating with a ring groove 22 and the interior of the piston.

The invention is claimed as follows:

1. A piston ring for internal combustion engines having three vertically spaced ribs arranged with one rib at the bottom of the ring, another rib at the top and a third rib intermediate the top and bottom ribs, the surfaces of all of said ribs lying in the same cylindrical surface, said ring having a series of elongated oil drain openings extending through the ring between the top and middle ribs with said openings closely adjacent and spaced by bridges, said ring also having a plurality of elongated imperforate recesses formed between the middle rib and the bottom rib circumferentially spaced by bridges, the bridges separating the openings being out of register with the bridges separating the recesses, said bridges lying in the same cylindrical surface with said ribs, and the bottoms of said recesses being inclined downwardly and outwardly and meeting the top edge of the bottom rib for providing oil seals between the ring and a cylinder wall.

2. A split piston ring provided with three vertically spaced ribs, one rib being at the bottom of the ring and another rib at the top and the third rib intermediate the top and bottom ribs, bridges connecting the top rib with the intermediate rib, other bridges connecting the bottom rib with the intermediate rib, the first mentioned bridges being out of register with the second mentioned bridges, said ring being slotted between the top and intermediate rib and between the bridges connecting said ribs, said rings being provided with shallow imperforate grooves between the intermediate and bottom ribs and being circumferentially spaced by the bridges connecting these ribs, the bottoms of said grooves being inclined and meeting with the top edge of said bottom rib, all of said ribs being circumferentially unbroken except at the split.

3. A piston ring having three vertically spaced ribs for engaging a cylinder wall and all lying in the same cylindrical surface, one rib being adjacent the top of the ring, another being adjacent the bottom of the ring and the third rib intermediate the top and bottom ribs, said ring having a plurality of circumferentially spaced openings therethrough between the top and intermediate ribs, and imperforate recesses between the bottom and intermediate ribs arranged in such manner that parts of two openings overlie a recess, the bottoms of said recesses being inclined downwardly and outwardly and meeting the upper edge of the bottom rib.

4. A split piston ring having three vertically spaced ribs for engaging a cylinder wall and all lying in the same cylindrical surface, one rib being adjacent the top of the ring, another rib being adjacent the bottom of the ring, and a third rib intermediate the top and bottom ribs, said rings having a plurality of circumferentially spaced elongated openings through the ring between the top and third ribs with the openings spaced by bridges lying in the cylindrical surface of the ribs, there being a plurality of elongated circumferentially spaced imperforate recesses between the middle rib and the bottom rib and with bridges spacing the recesses, the first mentioned bridges being out of register with the second mentioned bridges, the lower surfaces of said recesses being inclined downwardly and outwardly toward the periphery of the bottom rib and meeting the bottom rib above the lower surface of said ring, the upper surface of said recesses being normal to the periphery of the middle rib, and all three ribs being circumferentially unbroken except at the split portion of the ring.

ALBERT P. FALL.